Feb. 17, 1931.  A. E. BELLIS  1,792,674
METHOD OF HEATING SALT BATHS FOR HEAT TREATMENT OF METALS
Filed Dec. 14, 1928
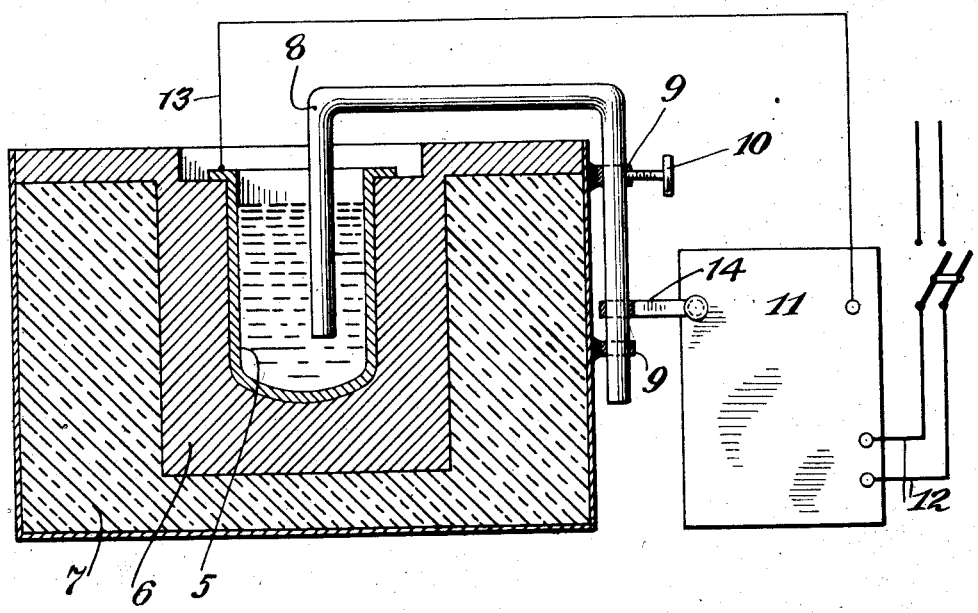
INVENTOR
Arthur E. Bellis
BY
his ATTORNEY Patented Feb. 17, 1931

1,792,674

UNITED STATES PATENT OFFICE

ARTHUR E. BELLIS, OF BRANFORD, CONNECTICUT

METHOD OF HEATING SALT BATHS FOR HEAT TREATMENT OF METALS

Application filed December 14, 1928. Serial No. 326,002.

This invention relates to an improved method and furnace for heat treating metals, and has for its primary object and purpose to provide a new method of heat treating metal tools and other objects in salt baths whereby contamination of the bath solution by reactions with the wall of the pot or crucible and resultant carburizing or pitting of the tools or other objects being treated is obviated.

This new method is essentially characterized by the heating of the bath liquid to the desired temperature by the direct action of an electric current passing between an electrode immersed in the bath and the wall of the pot or crucible. By the use of such a method, it will be evident that there is no limitation upon the amount of heat which can be supplied to the bath since the heat is not forced to flow through the pot wall and into the bath liquid. Consequently, the input of heat may proceed at such a rate as will permit production of the heat treated pieces limited only by the rapidity with which these metal pieces can absorb heat from the bath, and without liability of overheating the furnace structure.

Additional general objects and purposes of my present invention are to provide a method and means for the heat treatment of metals whereby I am enabled to dispense with many mechanical adjuncts and apparatus heretofore required in the operation of the furnace proper, such as for instance, burners, heating coils, supply and waste piping for water cooling, oil or gas feed piping and the like. Also, in addition to simplicity, economy in operation, and large productive capacity, by the use of my new method and furnace which enables the temperature of the bath to be easily and accurately controlled, absolute uniformity of result in the treatment of tools or other metal pieces of identical form and bulk is assured.

Further advantageous results of the present invention resides in the fact that by the use of the heating electrode immersed in the bath solution, the time at which the metal piece being treated reaches its critical transformation temperature may be determined by noting the demagnetization of the metal piece, or the time when the piece ceases to be attracted to the electrode, it being a well recognized fact that when the steel reaches the critical temperature point, it loses its magnetism. This feature eliminates the necessity for making elaborate pyrometer determinations of the temperature changes or the elaborate mechanical determinations of the critical temperature, such as the dilatometer method.

It is also a further important feature of my new method, that it is possible to generate additional heat by the formation of iron compounds resulting from the deterioration of the pot or the electrode. The cost of thus producing heat in the bath solution is appreciably less than that incident to the consumption of electric current in the use of other methods of combustion.

It is also an additional object of the invention to provide an electric furnace for carrying out my new method wherein means is provided for adjustably mounting the electrode so that the heat input may be regulated as desired for the most economic consumption of electric current in accordance with the particular heat treatment operation being conducted.

With the above and other objects in view, the invention consists in my new method of heat treating metals and in the several steps thereof, together with the novel features of my improved electric furnace, as will be hereinafter more fully described, illustrated in the accompanying drawing, and subsequently incorporated in the subjoined claims.

In the drawing, which is more or less diagrammatic, I have shown a vertical section through a pot or crucible furnace and have illustrated one example of the essential mechanical and electrical features employed in the practice of my new method.

Referring to this drawing, 5 designates the pot which may be produced from steel, chrome iron, or other metal alloy, either wrought or cast. Preferably however, this pot in its physical structure has the essential characteristics of the pot or crucible disclosed in Patent No. 1,573,535, issued to The Bellis Heat Treating Company, on February 16, 1926. The bath to be used as a heat transfer medium, preferably consists of a number of metallic salt components so selected and mixed as to produce a bath which when fluid is of low viscosity and may be heated to a desirably high temperature without fuming. For the heat treatment of high speed steel tools, the bath should be capable of attaining a temperature of 2500° F. without vaporization. There are well known salt materials of this character now on the market. However, since the subject matter of the present application is not concerned with any specific salt bath composition, it will not be herein further referred to in detail.

As shown in the drawing the pot 5 is first encased in fire brick indicated at 6 and this fire brick setting for the pot is in turn encased within a relatively thick walled insulating structure 7.

It will be understood that the form of the bath receiving pot and the insulating means therefore as shown in the drawing is purely suggestive, and not specifically essential to my present purpose. In conjunction with this furnace pot, I employ an electrode 8 which is mounted and arranged to extend downwardly into the pot 5 and the bath solution contained therein. This electrode may be of the same metallic composition as the wall of the pot 5. As herein illustrated, the electrode is of general U-shape form and is arranged in inverted position so that one end thereof extends into the pot while the other end of the electrode extends downwardly in parallel relation to one side wall of the furnace and is adjustably positioned through the suitably spaced guides 9 secured to said furnace wall. One of these guides is provided with a set screw or other suitable means shown at 10 whereby the electrode may be fixed in its adjusted position.

Electric current is supplied to the electrode 8 at low voltage, the value depending primarily upon the size and type of the pot 5. This necessitates the use of a transformer 11 as a part of the installation, alternating current being supplied to the primary of the transformer shown at 12 in which suitable automatic control means may be located. The transformers to be used in connection with the type of pot 5 shown in the drawing are rated at 220 to 11 volts, 20 k. v. a., when using 20 kilowatts. The current input at full power is 1820 amperes. The secondary of the transformer is connected by suitable conductors 13 and 14 to the pot 5 and the electrode 8 respectively. The heat efficiency will therefore, be very high, over 90° of the current power input being developed as heat directly in the bath itself. By the use of a suitable cover for the pot and the thick insulating walls, the heat losses are kept down to a very low value. In the illustrated furnace, 10 kilowatts is sufficient to maintain the temperature of the bath with a normal amount of removal of the pot cover, thus leaving 10 kilowatts available to heat the work.

From the above, it will be seen that by immersing the electrode in the bath, the current passes from the electrode through the bath solution to the wall of the pot 5. Such a method of heating the bath at once eliminates the necessity for the pot and its external surroundings being hotter than the bath, as is the case with oil or fuel fired furnaces or when electrical induction coils externally surrounding the pot are employed. In other words, the heat is initially generated directly in the salt bath itself where it is desired and the temperature gradient is downward all the way from the salt out through the wall of the pot and its support. Therefore, since the pot may be mounted in a heat insulating support of unlimited thickness great economy in power consumption can be effected with ample external protection to the pot against oxidizing effects of the atmosphere, together with a relatively low pot temperature for any given bath temperature, thus practically prolonging the life of the pot indefinitely. The new method of heating the salt bath to the requisite temperature thus achieves ultimate simplicity accompanied by maximum economy both in initial installation and in operation and maintenance costs.

The incidental advantageous features of the method above described are of no less importance. The electrode may be readily adjusted in depth and also positioned with respect to the side of the pot as may be required and most advantageous in accordance with the particular heat treatment operation, and the required temperature to be maintained in the bath. Thus, by merely raising or lowering the electrode, the heat input can be decreased or increased accordingly.

The salt material in solid form is an insulator, and in initially heating the solid material to reduce the same to a fluid condition, in conjunction with the electrode I may use an iron compound, such for instance as the commercial product known as "thermit". This material is placed on top of the solid salt between the electrode and the pot and upon ignition sufficient heat is generated to start the flow of electric current between the electrode and the pot wall. This is the common thermit reaction widely used in commercial welding operations. When a part of the salt has been melted, the electrode can then be adjusted and placed close to the pot wall so that a maximum amount of current will pass, and thus expedite the heating of the remaining solid salt. Also, if desired, to generate additional heat and economize in the use of electric current, I may use the thermit mixture in connection with the fused salt. In this manner, the salt may be heated very rapidly and at low cost to the desired temperature.

This same generation of additional heat in the bath also automatically occurs from the formation of iron compounds resulting from local reaction between the electrode and the bath solution. By the burning of the iron thus produced by deterioration of the electrode, the resultant generated heat may be a large part of that required for the work and as the cost incident to producing heat by the burning of such iron compounds is very low, the operating cost of my new method will be actually less than that incident to the consumption of electric current in other methods heretofore employed in this art. However, if desired, instead of melting the solid salt in this manner, an electric arc may be used.

I have also above referred to a single electrode, which will supply ample power for the heating of the bath in the particular type of furnace illustrated in the drawing, and thus afford ample space within the crucible for a comparatively large charge of tools or other work to be treated. However, it is of course, apparent that in other furnace installations having pots or crucibles of greater capacity, two or more heating electrodes may be employed and the current may be passed either between the multiple electrodes or the electrodes and the pot wall.

The salt bath material is so compounded that it is neutral to the metal to be treated, or in other words, chemical reactions between the bath material and the metal objects at high temperatures which would either carburize or decarburize the metal objects do not occur. For the hardening treatment of high speed tool steels, the bath has a temperature range of 1700° to 2500° F. without appreciable variation in viscosity or the emission of fumes or vapors. The hardening temperature is around 2400° F., but this same bath may also be used for preheating the metal at the lower temperature, thus avoiding the contamination of the hardening bath which might occur in the transfer of the metal objects thereto which have first been immersed in a separate preheating bath. I am of course, aware of the fact that such salt baths have been commercially used in this art, and have been heated either by means of electrical induction coils surrounding the pot or containers, or on the other hand, by the use of an electrode connected with the secondary side of a transformer in connection with a refractory pot or container. The latter method, is commercially practical only at low temperatures since any attempt to use the bath at the higher temperatures required for the hardening of high speed tool steels would result in reactions between the bath material and the refractory material of the pot, resulting in heavy contamination of the bath and the carburization or pitting of the steel objects being treated. Also, since refractory pots have a very short life, frequent replacements greatly adding to the operating and maintenance costs of the furnace are required. Also, the use of electrical resistance coils is not commercially feasible for the heating of salt baths at the higher hardening temperatures. In order to maintain such temperature in the bath, the wall of the pot or crucible must be kept at an excessively high temperature since the heat is transmitted from the coil through the pot wall to the bath materials. The rapid deterioration and breaking down of the pot or container and contamination of the bath solution will inevitably result. This fact alone makes the use of such resistance coils entirely impractical without regard to the expense incident to the initial installation of such heating equipment and the frequent replacement of the coils, owing to the excessively high resistance required.

My new method of heating such high temperature salt baths as above described, wholly overcomes the serious objections to the prior art methods just referred to, in that the heating medium is directly applied to the salt bath material itself and continuously flows through said material outwardly through a pot or container wall of steel or other high temperature resistant metal alloy. Thus, the reverse of the conditions which exist in connection with the use of electrical resistance coils is produced, and there is a descending temperature gradient as between the salt bath solution and the wall of the pot or container. Accordingly, mechanical or chemical reactions between the bath material and the pot wall at the hardening temperatures of the bath do not occur, and the bath therefore, will be at all times uncontaminated, and free from carbon or other impurities which would deleteriously affect the metal objects being treated. The relatively low temperature of the pot wall results in a greatly prolonged life of such pots while the original salt bath material may be continued in use almost indefinitely, it being necessary only to add small quantities of such material to the bath from time to time to compensate for that which is carried off in the form of a thin film on the metal objects when they are lifted from the bath. Since this salt material is comparatively expensive, it will thus be apparent that my new method will eliminate the major heavy item of expense in the use of prior art methods in connection with such salt baths due to the necessity of entirely discarding the bath after a short period of use owing to contamination and the making up of a new bath from fresh salt materials.

From the foregoing description, it will be seen that I have provided a highly efficient and serviceable method for use in the heating of high temperature salt baths which requires a minimum of equipment, and which will therefore, result in a very material decrease in installation and operating cost, together with large quantity production and perfect uniformity in the heat treatment of metal objects of the same kind. My new method, and apparatus to be employed in the practical operation thereof, also possesses the other well known collateral merits of the use of electrical heat, namely, compactness, convenience, safety, flexibility, etc.

It will also be appreciated from the foregoing description that my new method of heating readily lends itself to adaptation for use in connection with many different types of furnaces, and it will accordingly be understood that no limitations are to be implied from the particular furnace construction which I have selected for the purpose of illustrating one embodiment of the novel features of my present disclosure. Therefore, the privilege is reserved of adopting various changes in the mechanical form and arrangement of the furnace structure, the electrode and the means for adjustably mounting or supporting the latter, as may be fairly comprehended within the spirit and scope of the subjoined claims.

I claim:

1. A method of heat treating high temperature salt baths for the heat treatment of metals which consists in continuously passing a low voltage alternating electric current directly through the bath material between an electrode immersed in the bath and the metal wall of the pot or container.

2. A method of heating high temperature salt baths for the heat treatment of metals which consists in initiating the reduction of solid metallic salts in a pot or container to a fluid condition by burning an iron compound on the surface of the salt, and thereafter maintaining the salt material in liquid form and at a predetermined temperature by the passage of a low voltage electric current through the liquid bath between an electrode immersed therein and the metallic wall of the pot or container.

3. A method of heating high temperature salt baths for the heat treatment of metals which consists in passing a low voltage electric current directly through the liquid bath and maintaining a continuous current flow through the bath between an electrode immersed therein and the metallic wall of the bath container, and burning iron compounds formed by the disintegration of the electrode upon the surface of the bath and utilizing the heat thus generated to maintain the bath solution at a predetermined temperature.

4. A method of heating salt baths for the heat treatment of metals which consists in placing the salt materials within a crucible having an electrically conductive wall structure, and passing an alternating electric current through the salt material and the crucible wall structure whereby the bath is maintained at a predetermined temperature not exceeding the temperature of the crucible wall.

5. A method of heating salt baths for the heat treatment of metals which consists in placing the salt materials within a pot having a wall of electrically conductive metal, immersing an electrode in the bath salts and heating said salts to maintain the same in liquid form at a predetermined temperature, by causing a continuous flow of alternating electric current between the electrode and the pot wall.

In testimony that I claim the foregoing as my invention, I have signed my name hereto.

ARTHUR E. BELLIS.